United States Patent
Balasaygun et al.

(10) Patent No.: US 9,569,069 B2
(45) Date of Patent: Feb. 14, 2017

(54) SYSTEM AND METHOD FOR ADAPTIVE COMMUNICATION USER INTERFACE

(75) Inventors: Mehmet Balasaygun, Freehold, NJ (US); Rajeshwari Edamadaka, Allentown, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1414 days.

(21) Appl. No.: 13/248,605

(22) Filed: Sep. 29, 2011

(65) Prior Publication Data

US 2013/0086481 A1    Apr. 4, 2013

(51) Int. Cl.
*G06F 3/00* (2006.01)
*G06F 3/0482* (2013.01)
*G06F 3/0481* (2013.01)
*G06F 3/0484* (2013.01)

(52) U.S. Cl.
CPC ........... *G06F 3/0482* (2013.01); *G06F 3/0481* (2013.01); *G06F 3/0484* (2013.01)

(58) Field of Classification Search
CPC .................... G06F 2203/04808; G06F 3/0482
See application file for complete search history.

(56) References Cited

U.S. PATENT DOCUMENTS

| | | | |
|---|---|---|---|
| 7,620,894 B1 * | 11/2009 | Kahn | 715/707 |
| 2009/0104895 A1 * | 4/2009 | Kasturi | H04L 43/045 455/414.1 |
| 2009/0150807 A1 | 6/2009 | George et al. | |
| 2010/0056105 A1 | 3/2010 | Erhart et al. | |
| 2011/0028138 A1 * | 2/2011 | Davies-Moore et al. | 455/418 |

OTHER PUBLICATIONS

Paymans et al., "Usability trade-offs for adaptive user interfaces: ease of use and learnability", IUI04, Madeira, Funchal, Portugal, Jan. 13-16, 2004.
Liu et al., "An Adaptive User Interface Based on Personalized Learning", Human-Centered Computing, Published by the IEEE Computer Society, 2003.

* cited by examiner

*Primary Examiner* — Jeffrey A Gaffin
*Assistant Examiner* — Ayesha Huertas Torres
(74) *Attorney, Agent, or Firm* — Sheridan Ross P.C.

(57) ABSTRACT

Disclosed herein are systems, methods, and non-transitory computer-readable storage media for implementing, via a communication device, a set of algorithms to learn about user's usage of the device and provide automated customization to the device's user interface to improve ease of use and productivity of the end-user. This approach does not require the user's involvement by manually customizing the user interface, such as by setting up a speed dial list or a screen layout. The system automates rendering decisions and the content that is rendered based on the usage information. For example, if a user consistently calls a number every Tuesday and Wednesday morning regardless of scheduled calendar information, the communication device can provide a dynamic widget in the user interface for easy access to that number every Tuesday and Wednesday morning. The user can dial the number easily via the widget without the dial pad or a contacts application.

20 Claims, 6 Drawing Sheets

SYSTEM AND METHOD FOR ADAPTIVE COMMUNICATION USER INTERFACE

BACKGROUND

1. Technical Field

The present disclosure relates to user interfaces and more specifically to adapting communication device user interfaces based on usage patterns and context.

2. Introduction

Many communication devices provide a set of capabilities to their users via a user interface in a deterministic and static way. A user usually interacts with a set of pre-determined rules and screens that have some degree of rendering flexibility or customization options. This customization typically allows the user to select rendering themes or options that customize the look and feel of the device. Users can arrange or create icons, folders, or groups of applications, widgets, and other user interface elements. Some devices allow a user to set up templates of multiple different configurations of icons, between which the user can easily switch. Users can also customize other 'look and feel' aspects of the user interface by manipulating icon placement on a screen, resizing icons, selecting themes for colors, sounds, background, ringtones, and so forth. However, these interface customizations are based on explicit user instructions to modify the user interface.

The current solutions do not automatically improve user interfaces for communication devices without explicit user instructions, customizations, or static rendering selections that user has previously made. Some users may be unaware of such available options to customize their user interface, or may be intimidated by the prospect of 'messing up' what already works. Further, if a user makes the changes on one device and becomes accustomed to those changes, the user must manually remember and recreate those changes on another device to maintain a consistent experience.

Some Internet-based vendors, such as Amazon.com, use purchase and search history to provide custom suggestions to on-line shoppers. However, this requires shoppers to interact with the vendor's web site to read about suggestions made by the system and is not directly applicable to telecommunications devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Current solutions do not make communication devices more productive by allowing them to learn from users' past usage patterns and automatically implement user interface customizations. This disclosure discusses providing custom content and/or a modified user interface based on a user's usage actions/pattern and optionally based on a current context, and is not based on a static rendering selection or setting that user may have made in the past. This approach improves usability of a communication device by implementing algorithms on the device to make automatic rendering decisions based on the user's actions and usage patterns over time. This approach can provide information to the user in a way that makes the use of the communication device more productive and efficient.

This disclosure illustrates how to automate rendering decisions of a user interface of a communication device and the content that is rendered based on usage information and patterns. For example, if a user consistently places a call to a number every Tuesday and Wednesday morning, regardless of entries in a calendar application, the communication device can provide a dynamic speed dial list entry or a widget in the user interface with the called number every Tuesday and Wednesday morning. In this way, the user can dial the number more easily by interacting with the simpler widget, rather than interacting with a dial pad or a contacts application. These kinds of dynamic widgets can come and go based on the usage patterns that the device learns over time.

In another example, the device tailors what is visible on the user interface based on the usage pattern. For example, if a user is usually uses the communication device to dial out from the missed call entries, the missed call entries part of the Call Log application can be brought into the foreground so the user can interact with it directly. The missed call entries can be brought to the foreground as a one-click icon, an interactive widget on a home screen of the communication device, or in some other location. Similarly, the device can gather statistical data on use of its key applications, and make certain customizations to the way the apps are rendered. For example, in a user interface layout where contacts, call logs, dial pad are all shown to the end user at all times, the statistical information from dialing patterns from these apps can be used to give a relative proportion of the screen real estate based on the usage frequency. For example, if user dials from contacts app 20% of the time, 50% from call logs, and 30% from dial pad, the real estate used by these three different applications can be proportionally adjusted to follow user's usage pattern.

In yet another example, the device brings one or more applications to the foreground based on a communication partner with whom the user is communicating and usage patterns associated with that communication partner. For example, an applications fan view can automatically bring out the applications, such as web collaboration, calculator, liquid analytics, or some other app, based on the communication partner. The device can track and identify patterns in the type of media used for communication, caller ID information, which access network interface is used, and so forth, in order to improve the communication experience of the end-user. Previous solutions do not address ease of use of a communication device by learning from a user's habits and communication patterns.

Disclosed are systems, methods, and non-transitory computer-readable storage media for customizing a user interface based on usage patterns and a communication context. A system configured to practice the method receives interface usage data associated with a user and a user interface for a communication device and identifies usage patterns based on an analysis of the interface usage data. The communication context can be a current communication context and/or an anticipated communication context. The communication context can include a party with whom the user is communicating, a communication modality, caller ID information, which access network interface is used, calendar information, call metadata, all or part of the user's conversation, and so forth. The system can receive communication context information from multiple sources.

Then the system can modify the user interface for the communication device based on the usage patterns and a communication context of the user. The system can modify the user interface by providing custom content, rearranging user interface elements, changing appearance of user interface elements, introducing a dynamic widget, and/or moving a user interface element to foreground. For example, the system can identify information that the user desires in the communication context, and modify the user interface to present the information. The system can modify the user interface so as to improve at least one of ease of use, productivity, and efficiency of the user. The system can modify the user interface by proportionally adjusting each of a set of user interface elements based on usage frequency of the set of user interface elements. The user interface can display at least one reason why the user interface was modified in a particular way.

The system can also receive user feedback, in response to modifying the user interface, that indicates approval or rejection to modifications to the user interface for a given communication context. The user can approve or indirectly confirm the modifications to the user interface by interacting with the modification. Conversely, if the user consistently ignores or only minimally interacts with the modification, the system can interpret those actions and/or inactions as a complete or partial rejection of the modification.

The system can rearrange existing user interface elements, bring user interface elements to the fore, modify the appearance, behavior, or other attributes of existing user interface elements, remove user interface elements, and/or generate new user interface elements.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for automatically improving efficiency of user interfaces based on usage patterns and communication context. A brief introductory description of a basic general purpose system or computing device in FIG. 1 which can be employed to practice the concepts is disclosed herein. A more detailed description of user interface modifications and usage patterns will then follow. These variations shall be discussed herein as the various embodiments are set forth. The disclosure now turns to FIG. 1.

Figure 1:
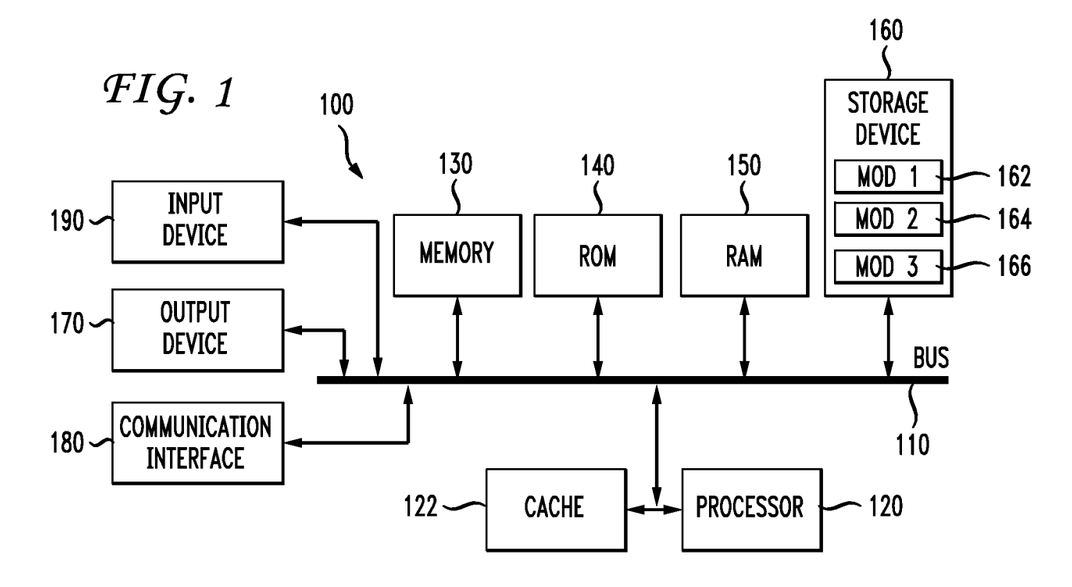
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
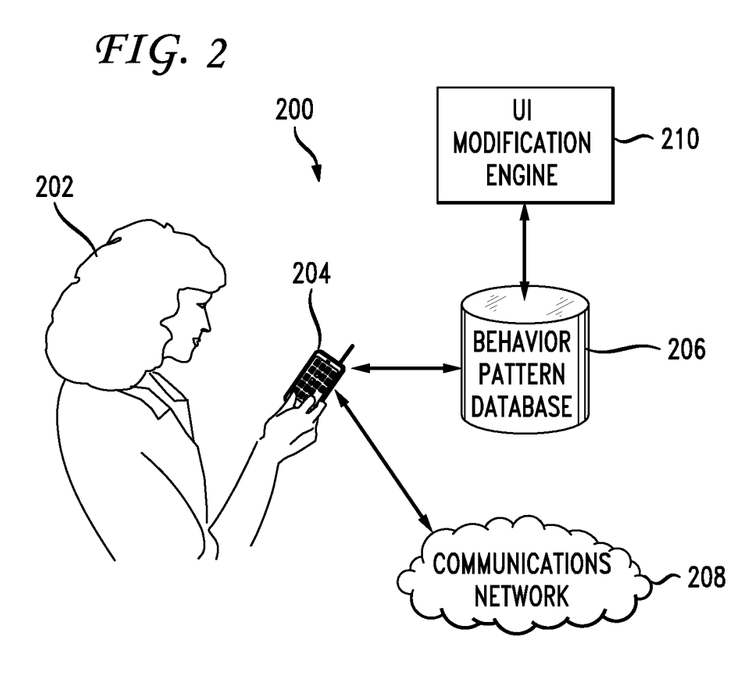
FIG. 2 illustrates an example communication device with an automatically modifiable user interface.

Having disclosed some components of a computing system, the disclosure now turns to FIG. 2, which illustrates an example arrangement 200 including a communication device 204 with an automatically modifiable user interface. The user 202 interacts with the communication device 204 to communicate with others via a communication network 208 such as the public switched telephone network (PSTN), the Internet for Voice over IP (VoIP) calls, or other public and/or private communications network. The communication device can be a desktop telephone, a cellular phone, a smartphone, a computer, a tablet computing device, a personal digital assistant (PDA), softphone, and/or any other device capable of connecting to and communicating via a communications network.

As the user 202 interacts with the communication device 204 and with the communications network 208, the communication device 204 contributes information to a behavior pattern database 206. The behavior pattern database can include directly observable information, inferable information, information gathered from multiple sources, including sources other than the local communication device 204.

The user interface modification engine 210 compares a current and/or anticipated communication context of the user 202 and the communication device 204 to information in the behavior pattern database 206. When the user interface modification engine 210 finds a behavior pattern that is sufficiently close to the current and/or anticipated communication context, the user modification engine 210 instructs the communication device 204 to modify its user interface in some way.

The behavior pattern database 206 can be stored on the communication device 204 and/or on a network-based storage. In one aspect, the user 202 can transfer the behavior pattern database 206 to another device, such as a replacement smartphone, an upgraded desktop telephone, or to removable media such as a microSD flash card. The behavior pattern database 206 can include several separately stored databases. The user 202 can view, edit, and otherwise manage usage patterns. The user 202 can select which patterns in the behavior pattern database 206 are important and should have influence over the user interface of the device 204, or which patterns to ignore or accord less influence. The user 202 can correct improperly recorded usage patterns or usage patterns which are no longer valid or useful. The user 202 can mark certain usage patterns or variables in the usage patterns in the behavior pattern database 206 as static or not subject to future adaptations.

The behavior pattern database 206 can include usage patterns spanning multiple communications devices. For example, if, when a user receives a call from a particular caller at a set-top phone, the user hangs up and redials the caller from a mobile phone, the behavior pattern database 206 information can influence the user interface modification engine 210 to modify the user interface on the device 204 to set up and display to the user 202 a 1-click button to 'transfer incoming call to mobile phone'. The 1-click button can initiate a temporary conference call between all three lines to facilitate the transfer, or take some other action.

In some instances, the user interface modification engine 210 can perform an analysis to determine an amount of effort or time required to navigate to perform an anticipated task via the existing user interface arrangement of elements. The amount of effort or time can include how many steps are required, how much time is required, a difficulty level, how much time the user usually takes, and/or other considerations. Then, based on that information, the user interface modification engine 210 can determine whether a proposed new location or new user interface element, arrangement, or modification is more efficient, effective, and/or discoverable than the old or existing one. The user interface modification engine 210 can compare the existing and the proposed modification, and if the proposed modification meets a threshold reduction in complexity, steps, time, etc., then the user interface modification engine 210 can implement the proposed modification.

In some variations, modifications to the user interface can have an associated duration, fixed or dynamic, based on the communication context and the behavior pattern database. An example of a fixed duration is a modification that lasts for 5 minutes. An example of a dynamic modification is a modification that remains in place for as long as a conference call is on-going. Another example of a dynamic modification is a modification that endures as long as the current communication context is within a threshold similarity of a usage pattern in the behavior pattern database 206, and extends for 30 seconds after the current communication context drops below the threshold similarity. The 30 second extension of the modification can be trumped or pre-empted by detecting changes in the communication context that more closely match another behavior pattern which prompts a different modification of the user interface.

Figure 3A:
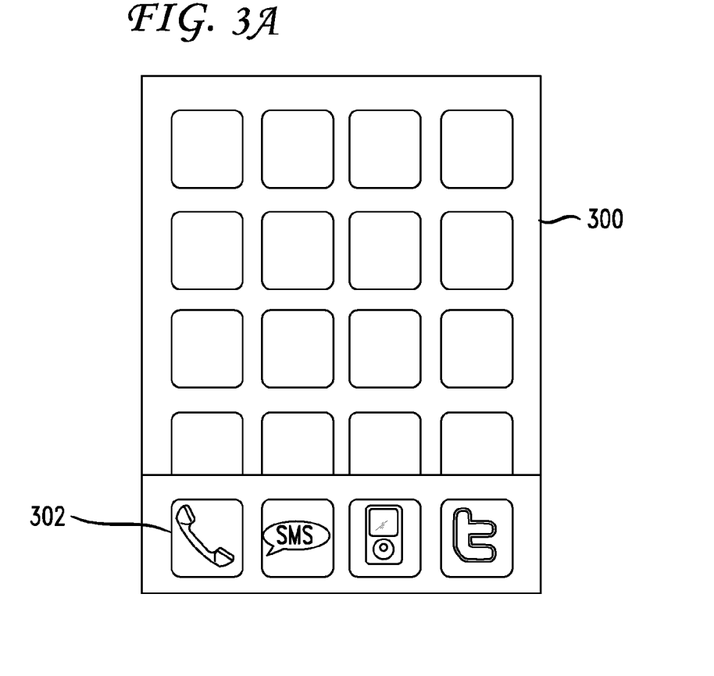
FIG. 3A illustrates a first example user interface.
Figure 3B:
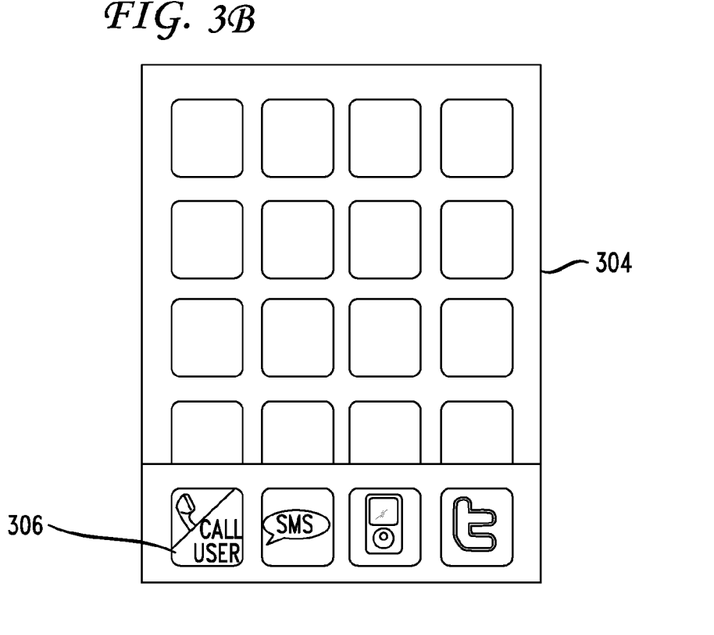
FIG. 3B illustrates a dynamic modification of the first example user interface.

The disclosure now turns to several illustrative example user interfaces and modifications to the example user interfaces. FIG. 3A illustrates a first example user interface 300 and FIG. 3B illustrates a dynamically modified first example user interface 304. The first example user interface 300 is for a mobile device. The first example user interface 300 shows a phone icon 302 for opening up a dial pad to allow the user to dial a number to place a call. If the current communication context matches a behavior pattern indicating that the user wishes to make a call to a specific recipient, the system can modify the user interface, as shown in FIG. 3B for example, to modify the phone icon 302 by splitting the icon into two portions 306: one portion for the usual dial pad and another portion being a one-click button to dial the specific recipient. Thus, the user interface can be modified by introducing elements that fit within the constraints of existing user interface elements to provide easy access to additional or modified functionality. However, the modification can introduce completely new user interface elements, rearrange, relocate, and/or resize existing user interface elements, and so forth.

Figure 4A:
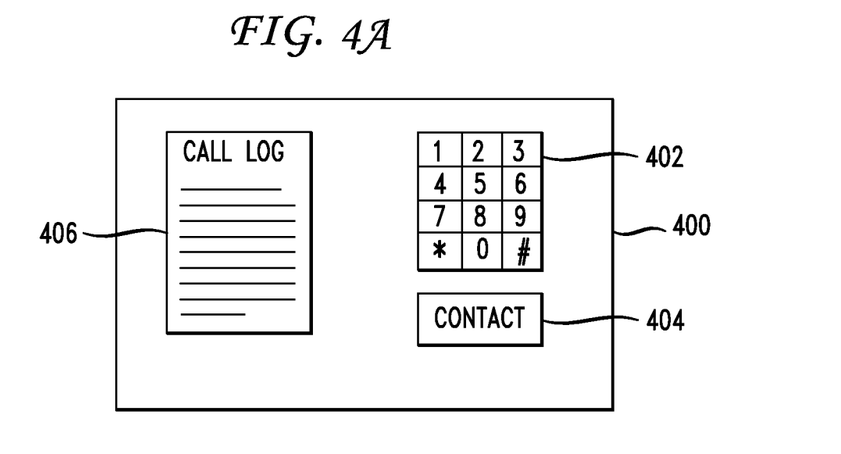
FIG. 4A illustrates a second example user interface.
Figure 4B:
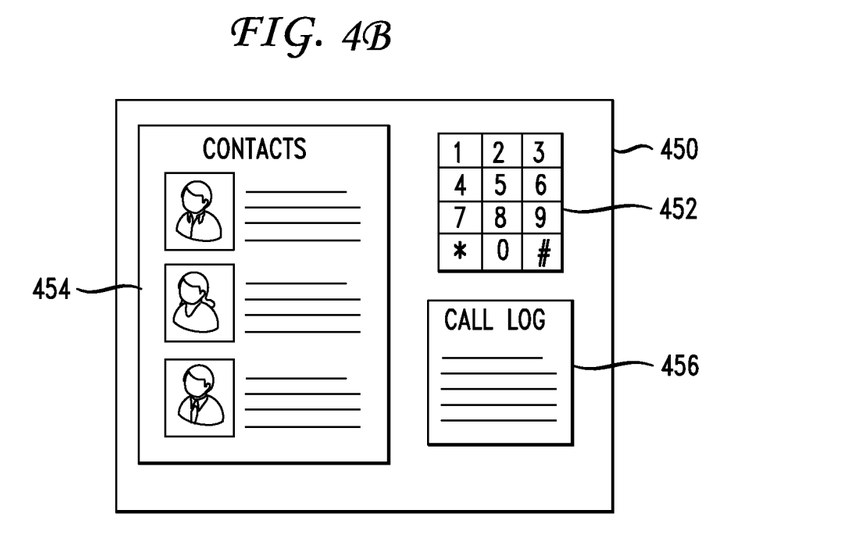
FIG. 4B illustrates the second example user interface incorporating proportional adjustments based on usage frequency.

For example, FIG. 4A illustrates a second example user interface 400 and FIG. 4B illustrates a modified second example user interface 450 incorporating proportional adjustments based on usage frequency. The second example user interface 400 includes a dial pad 402, a contacts button 404, and a call log 406. The system can tailor what is visible on the user interface based on the usage pattern. For example, if the user usually dials numbers selected from the missed call entries, the system can bring missed the call entries part of the Call Log application into the foreground for user to interact with it directly. Similarly, the device can gather statistical data on how applications are used and make certain customizations to the way the applications are rendered. For example, in a user interface layout where contacts 404, call logs 406, and dial pad 402 are all shown to the end user at all times, the statistical information from dialing patterns from these apps can be used to give a relative proportion of the scene real estate based on the usage frequency. For example, if user dials from contacts app 60% of the time, 15% from call logs, and 25% from dial pad, the system can proportionally adjust the display real estate used by these three different applications 452, 454, 456 according to the user's usage pattern. In some cases, where the contacts app 404 increases in size 454, the system can enlarge or show more of the same type of information, and/or can enhance the type of information presented on the user interface. For example, the modified contacts app 454 shows a profile image of contacts as well as some additional lines of information about contacts, as opposed to the original, smaller contacts app 404.

In yet another example, the system can bring certain applications to the foreground based on who the user is communicating with. For example, on a mobile device that arranges applications in a fan structure, the applications fan view can automatically bring out the applications (such as web collaboration, calculator, liquid analytics, or some other app) based on a communication recipient with whom the user is communicating. The system can track and learn from which media is used for communication, the caller ID, which access network interface is used, and/or other factors to improve the communication experience of the end-user.

When the system modifies the user interface in some way, the system can provide a notification to the user that a user interface element has been changed, as well as an explanation why, and/or a tutorial to show how to best make use of the modification. The notification can be a dismissible message, a transient notification such as a popup that the user can click on for more information, or a message that disappears after a period of inactivity if the user does not interact with it. The notification can be sent via the same device on which the user interface has been modified or via a different device.

Figure 5:
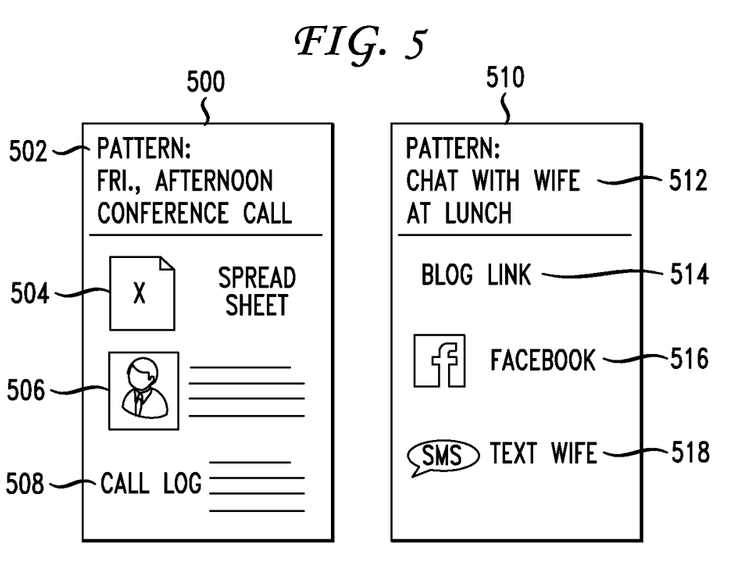
FIG. 5 illustrates two separate views of a persistent widget for providing customized user interface elements.

FIG. 5 illustrates two separate views 500, 510 of a persistent widget for providing customized user interface elements. The widget can appear on a home screen of a mobile device, on a widget sidebar on a desktop operating system, or on a display of a desk-top phone, for example. The system can continuously update the persistent widget based on matching an incoming context stream to stored usage patterns. The persistent widgets 500, 510 can show a title of a recognized pattern 502, 512, as well as resources corresponding to the recognized pattern. For example, under "Friday Afternoon Conference Call" 502, the widget 500 can provide access to spreadsheet 504, contact information 506, and a call log 508 associated with that recognized pattern. Under "Chat with Wife at Lunch" 512, the widget 510 can include a blog link 514, a link to a Facebook profile 516, and a shortcut to send a text message to the wife 518. The persistent widget can include links, shortcuts, information feeds, documents, and/or other interactive components. The communication device can display the persistent widget in the same location on the user interface and update the contents of the persistent widget according to the communication context and the behavior pattern database.

Figure 6:
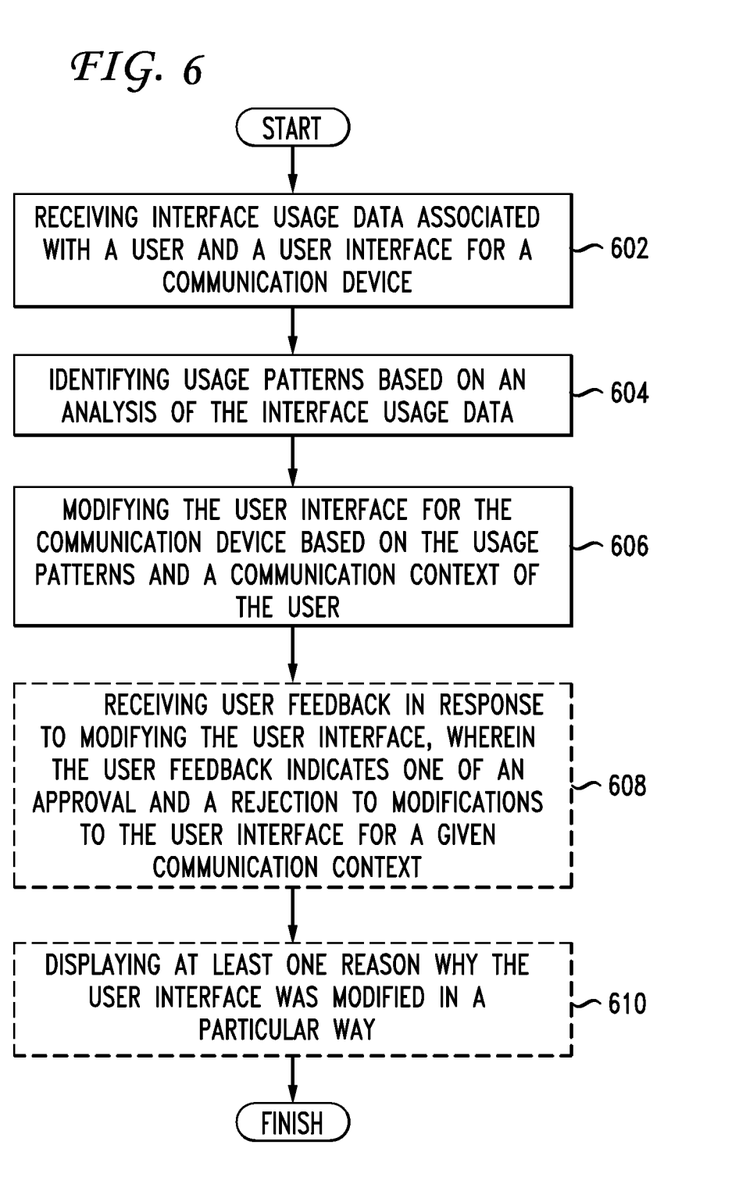
FIG. 6 illustrates an example method embodiment.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 receives interface usage data associated with a user and a user interface for a communication device (602) and identifies usage patterns based on an analysis of the interface usage data (604). The communication context can be a current communication context and/or an anticipated communication context. The communication context can include a party with whom the user is communicating, a communication modality, caller ID information, which access network interface is used, calendar information, call metadata, all or part of the user's conversation, and so forth. The system can receive communication context information from multiple sources.

Then the system can modify the user interface for the communication device based on the usage patterns and a communication context of the user (606). The system can modify the user interface by providing custom content, rearranging user interface elements, changing appearance of user interface elements, introducing a dynamic widget, and/or moving a user interface element to foreground. For example, the system can identify information that the user desires in the communication context, and modify the user interface to present the information. The system can modify the user interface so as to improve at least one of ease of use, productivity, and efficiency of the user. The system can modify the user interface by proportionally adjusting each of a set of user interface elements based on usage frequency of the set of user interface elements. The user interface can optionally display at least one reason why the user interface was modified in a particular way (610).

The system can optionally receive user feedback, in response to modifying the user interface, that indicates approval or rejection to modifications to the user interface for a given communication context (608). The user can approve or indirectly confirm the modifications to the user interface by interacting with the modification. Conversely, if the user consistently ignores or only minimally interacts with the modification, the system can interpret those actions and/or inactions as a complete or partial rejection of the modification.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, by a processor, interface usage data associated with a user and a user interface for a first communication device;
identifying, by the processor, application usage patterns based on an analysis of the interface usage data; and
modifying, by the processor, the user interface for the first communication device based on the application usage patterns and a communication context associated with a communication session between the first communication device and a second communication device, the communication context comprising a communications pattern exhibited by the user during a previous communication session and an identity of a participant in the communication session associated with the second communication device, wherein modifying the user interface comprises presenting different applications in a foreground of the user interface based on the application usage patterns.

2. The method of claim 1, further comprising:
identifying, by the processor, custom content relevant to the usage patterns and the communication context, wherein the custom content comprises an application feature; and
modifying, by the processor, the user interface to present the custom content.

3. The method of claim 1, wherein modifying, by the processor, the user interface further comprises at least one of providing, by the processor, custom content, rearranging, by the processor, user interface elements, changing, by the processor, appearance of user interface elements, introducing, by the processor, a dynamic widget, or moving, by the processor, a user interface element to foreground.

4. The method of claim 1, further comprising:
receiving, by the processor, user feedback in response to modifying the user interface, wherein the user feedback indicates one of an approval or a rejection to modifications to the user interface for a given communication context.

5. The method of claim 1, wherein the identity of the participant in the communication session associated with the second communication device comprises a caller ID.

6. The method of claim 1, wherein the communications pattern comprises data regarding multiple communication sessions, wherein at least one of the multiple communication sessions is associated with the first communication device.

7. The method of claim 1, wherein the communication context is an anticipated communication context.

8. The method of claim 1, wherein modifying, by the processor, the user interface further comprises proportionally adjusting, by the processor, each of a plurality of user interface elements based on a usage frequency of the plurality of user interface elements.

9. The method of claim 1, wherein modifying, by the processor, the user interface further comprises splitting at least one icon into multiple icons.

10. A system comprising:
a processor; and
a memory coupled to the processor that includes instructions that cause the processor to:
receive interface usage data associated with a user interface;
identify application usage patterns based on an analysis of the interface usage data; and
send instructions to modify the user interface based on the application usage patterns and a communication context associated with a communication session between the first communication device and a second communication device, the communication context comprising a communications pattern exhibited by a previous communication session and an identity of a participant in the communication session associated with the second communication device, wherein the instructions to modify the user interface comprise instructions to present different applications in a foreground of the user interface based on the application usage patterns.

11. The system of claim 10, further comprising instructions that causes the processor to:
identify custom content relevant to the usage patterns and the communication context, wherein the custom content comprises an application feature; and
modify the user interface to present the custom content.

12. The system of claim 10, wherein the instructions cause the processor to modify the user interface by splitting an icon into multiple icons.

13. The system of claim 10, further comprising instructions that causes the processor to:
receive user feedback in response to modifying the user interface, wherein the user feedback indicates one of an approval or a rejection to modifications to the user interface for a given communication context.

14. The system of claim 10, further comprising instructions that causes the processor to:
send instructions to the first communication device to display at least one reason why the user interface was modified in a particular way.

15. The system of claim 10, wherein the communications pattern comprises data regarding multiple communication sessions, wherein at least one of the multiple communication sessions includes the system and at least one other of the communication session does not include the system.

16. The system of claim 10, wherein the communication context is an anticipated communication context.

17. The system of claim 10, wherein modifying the user interface further comprises proportionally adjusting each of a plurality of user interface elements based on a usage frequency of the plurality of user interface elements.

18. The system of claim 10, wherein the interface usage data comprises data spanning multiple communication devices used by a single user.

19. A method:
receiving, via a network-based server, interface usage data associated with a user interface for a remote communication device;
identifying, via the network-based server, application usage patterns based on an analysis of the interface usage data;
storing, via the network-based server, the application usage patterns in a database;
transmitting, via the network-based server, an instruction to the remote communication device for modifying the user interface for the remote communication device based on the application usage patterns and a communication context associated with a communication session between the remote communication device and a second remote communication device, the communication context comprising a communications pattern exhibited during a previous communication session and an identity of a participant in the communication session associated with the second remote communication device, wherein the instructions to modify the user interface comprise instructions to present different applications in a foreground of the user interface based on the application usage patterns.

20. The method of claim 19, further comprising:
identifying custom content relevant to the usage patterns and the communication context, wherein the custom content comprises a resource; and
modifying the user interface to present the custom content.

* * * * *